United States Patent
Gandhi et al.

(10) Patent No.: US 10,067,863 B1
(45) Date of Patent: Sep. 4, 2018

(54) FEATURE TARGETING OF TEST AUTOMATION LAB MACHINES

(71) Applicant: Microsoft Technology Licensing, LLC, Redmond, WA (US)

(72) Inventors: Akshay Gandhi, Seattle, WA (US); James S. Luke, Bellevue, WA (US); Khalid Mahmood, Redmond, WA (US); Anjali Muralidhar, Seattle, WA (US); Sebastian Kohlmeier, Mountlake Terrace, WA (US); Krishnan Thazhathekalam, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/586,711

(22) Filed: May 4, 2017

(51) Int. Cl.
    *G06F 9/44* (2018.01)
    *G06F 11/36* (2006.01)
    *G06F 8/71* (2018.01)

(52) U.S. Cl.
    CPC ............ *G06F 11/3688* (2013.01); *G06F 8/71* (2013.01)

(58) Field of Classification Search
    CPC .......................................................... G06F 9/44
    USPC .................................................. 717/124–127
    See application file for complete search history.

(56) References Cited

U.S. PATENT DOCUMENTS

| | | | |
|---|---|---|---|
| 5,991,720 A * | 11/1999 | Galler .................... | G10L 15/08 704/251 |
| 7,614,042 B1 | 11/2009 | Hardy et al. | |
| 8,074,204 B2 | 12/2011 | Comstock et al. | |
| 8,091,066 B2 | 1/2012 | Fiore | |
| 8,515,015 B2 | 8/2013 | Maffre et al. | |
| 8,914,794 B2 | 12/2014 | Bliss et al. | |
| 2009/0307763 A1 | 12/2009 | Rawlins et al. | |
| 2011/0307860 A1 * | 12/2011 | Park ......................... | G06F 8/30 717/107 |

(Continued)

OTHER PUBLICATIONS

"How to: Override Settings in Your Test Plan for Test Runs", http://web.archive.org/web/20140822194807/http:/msdn.microsoft.com/en-us/library/ff423847(v=vs.110).aspx, Published on: Aug. 22, 2014, 3 pages.

(Continued)

*Primary Examiner* — Jae Jeon
(74) *Attorney, Agent, or Firm* — Schwegman Lundberg & Woessner, P.A.

(57) ABSTRACT

In some embodiments, the disclosed subject matter involves a system and method relating to automation test runs of a software build, where the test runs effect impersonating an automation audience and selecting optional features to test with the automation audience. The automation audience is associated with a software build having static features, and the test runs include optional features, where each optional feature may have more than one associated treatment. Each feature/treatment combination may be tested in a test scenario associated with the feature/treatment combination. New features that are exposed in other audiences may be enabled for the automation audience to assist in verification and test of the new features. Dynamic selection of the optional features is effected using an application program interface (API) in the source code for the features, where the API accesses feature configuration information during runtime. Other embodiments are described and claimed.

15 Claims, 11 Drawing Sheets

(56) References Cited

U.S. PATENT DOCUMENTS

| | | | |
|---|---|---|---|
| 2014/0215440 A1* | 7/2014 | McKee | G06F 11/3684 717/124 |
| 2015/0277899 A1* | 10/2015 | Hamby | G06F 8/41 717/120 |
| 2016/0063282 A1 | 3/2016 | Shani et al. | |

OTHER PUBLICATIONS

"Streamlining the development process with feature fighting and Azure cloud services", https://msdn.microsoft.com/en-us/library/mt238502.aspx, Published on: Jun. 2015, 11 pages.

"API Monitoring & Testing: Managing Configuration with Environments", http://web.archive.org/web/20160304215509/https:/www.runscope.com/docs/api-testing/environments, Published on: Mar. 4, 2016, 5 pages.

Glas, Ed, "Parameterizing Tests to Run in Different Environments", https://blogs.msdn.microsoft.com/edglas/2010/02/16/parameterizing-tests-to-run-in-different-environments/, Published on: Feb. 16, 2010, 11 pages.

"The Complete Automation Solution for Testing", https://www.sayeureqa.com/solutions/, Retrieved on: Dec. 29, 2016, 18 pages.

"Selenium Automation Framework (SAF)", http://web.archive.org/web/20140210145337/http:/www.mindtree.com/sites/default/files/mindtree-brochures-selenium-automation-framework-saf.pdf, Published on: Feb. 10, 2014, 3 pages.

Ellis, Megan, "Feature Flags, Toggles, Controls", http://web.archive.org/web/20151212222330/http:/featureflags.io/feature-flags/, Published on: Dec. 12, 2015, 13 pages.

"Reusing Tests across Different Environments", https://ghostinspector.com/docs/reusing-tests-different-environments/, Retrieved on: Dec. 29, 2016, 4 pages.

* cited by examiner

FEATURE TARGETING OF TEST AUTOMATION LAB MACHINES

TECHNICAL FIELD

An embodiment of the present subject matter relates generally to software builds, and more specifically, but not by way of limitation, to controlling an automated test environment for software builds having dynamically selected features.

BACKGROUND

Various mechanisms exist for testing software builds and new software versions. Configuration management systems are often used where a developer, or developer team, may check software modules in and out of the system. When a module or update is checked in, the module gets compiled and linked with other modules and features to build the final product.

As software systems become larger and more complex, and as marketing schemes with incremental level functionality become more popular, it becomes more and more difficult to test various versions of the software build. For instance, in a typical development environment, different teams work concurrently on different aspects of the entire system, including bug fixing and new features or enhancements.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

SUMMARY

Figure 1:
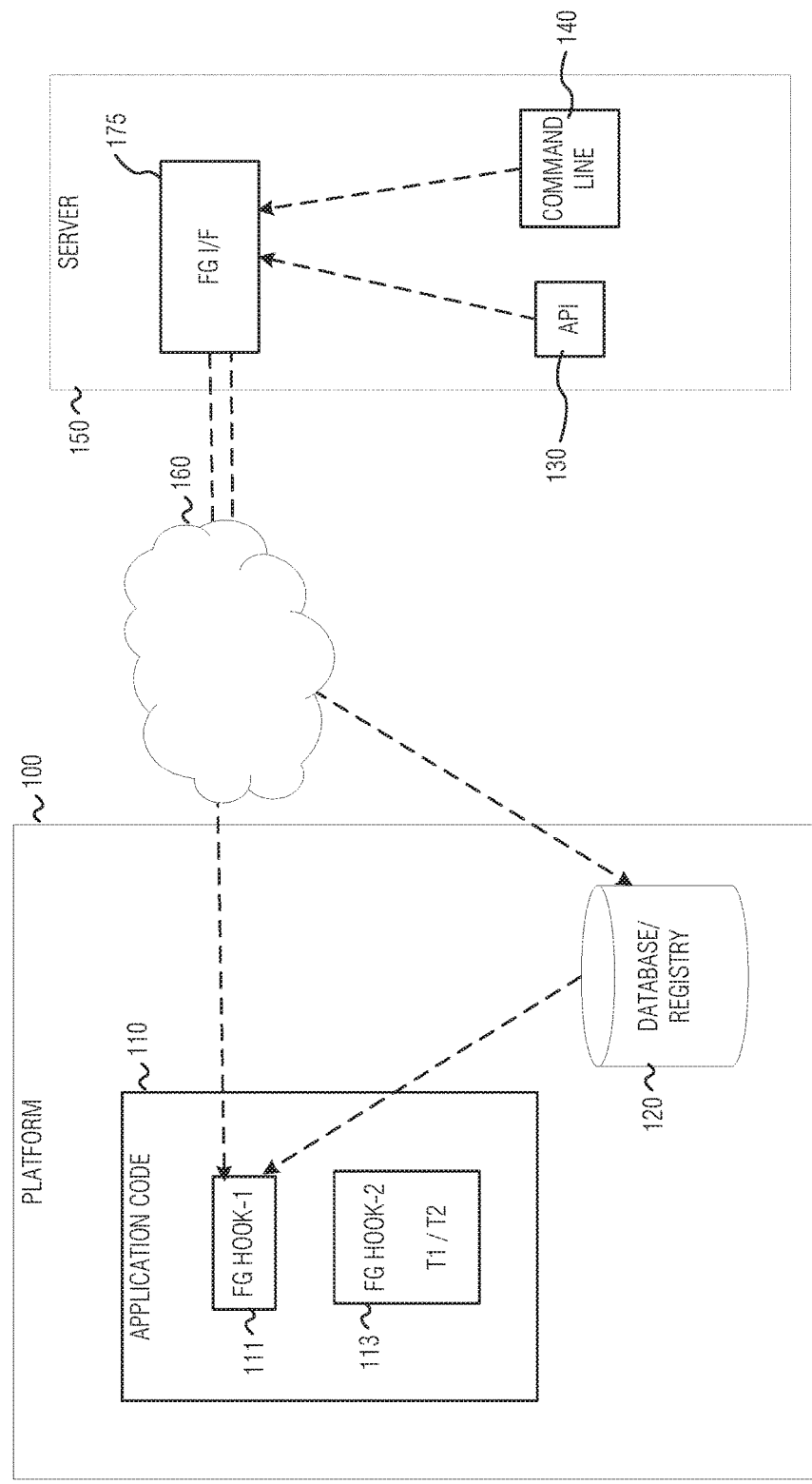
FIG. 1 is a diagram illustrating feature gates in software builds, according to an embodiment.

Some organizations may deploy a system, or software build, with different feature sets or operational parameters to different audiences or user populations. As new features are developed, the new features should be tested with each deployed version for each audience. However, a development team may be unaware of which features are being developed by other teams and how the features may interact for different user populations. Embodiments as described herein use feature gates, or hooks, in software application code to enable an application program interface (API) to utilize classes and objects for access to configuration parameters that define the operational state of optional features in the software build, at runtime.

The subject matter disclosed herein allows a test team to "A/B test" features with various client builds and for successive rings of audiences. In an embodiment, at each test phase, and at each ring, new features may be included with a baseline build for the audience associated with the ring. As a feature passes testing for an audience, that feature may be added to the audience baseline and then be tested as an optional feature for the next ring audience, until the feature is stable enough to be added into the final production baseline build (e.g., innermost ring). Features in the application code associated with, and included in a build, may be disabled at runtime, so that the feature is hidden to the end-user in the audience.

In existing systems, it is difficult to test the many dynamic features with features already added to the baseline of another audience, or ring, because a feature may not typically be promoted to a next ring audience until fully tested at the current ring. Existing systems typically cannot ship software builds with different features to different audiences due to the enormous effort required for quality testing. In the past, if a bug was found in a feature, it might force the developers to go back to the beginning of the test process and delay deployment for a significant amount of time, to back out the faulty feature.

Embodiments described herein allow a test engineer or developer to impersonate an automation audience to enable testing of at least one optional feature with the baseline build for one or more audiences. Impersonating the audience allows features to be tested with other features or baselines that are outside of the standard ring promotion procedure. For instance, in a development and testing paradigm that utilizes four successive rings of audiences, a newly developed feature may be tested at the innermost or most stable ring by impersonating that audience. In a typical lab test environment, the newly developed feature would normally only be tested at the outermost ring or audience, with other less stable features. Impersonation of an audience means that features, configurations, and treatments for the selected audience and channel are present in the software build. Any additional optional features, treatments, or filters to be selected may be included as override commands before the test run is built. In an example, various optional features may be enabled in the same build to be tested together in an automation test run, regardless of which ring or audience is associated with the optional feature. Features having passed in different rings may be tested together and/or selectively disabled regardless of in which ring the feature has passed or failed testing with a baseline for that ring.

Embodiments as disclosed herein provide a system for automation testing of a software build according to an automation audience, comprising a processor to execute automation build logic, the automation build logic configured to generate the software build for an automation test using build configuration information to identify static and optional features for inclusion in the software build, for the automation audience. A configuration database may be coupled to the processor, the configuration database storing feature configuration information, wherein feature configuration information associated with a feature includes filter information for audience, platform, architecture; and where the automation build logic is further configured to, in response to instructions to build an automation test build with the automation audience, generate a data file identifying configuration settings for a test machine, wherein the configuration settings include feature information for the software build, where a feature is identified as enabled if the feature is configured for the current audience or specified by the user as enabled for the automation audience build, the automation audience build being defined in the configuration database. The feature may be enabled unless overridden in the instructions, and wherein the automation build logic is further configured to initiate configuration of the test machine according to the data file identifying configuration settings for the test machine, after a data wipe of the test machine.

Other embodiments may include a method, means for performing acts of the method, at least one machine-readable medium including instructions that, when performed by a machine cause the machine to perform acts of the method, or of an apparatus or system for impersonating an audience in an automation test lab to manage and test software quality in a software build for the impersonated audience.

DETAILED DESCRIPTION

In the following description, for purposes of explanation, various details are set forth in order to provide a thorough understanding of some example embodiments. It will be apparent, however, to one skilled in the art that the present subject matter may be practiced without these specific details, or with slight alterations.

An embodiment of the present subject matter is a system and method relating to controlling an automated test environment. An embodiment uses an application program interface (API) to override default test automation settings. Automation features may be tested concurrently to identify compatibility issues among optional features and baseline builds. Determining which features to be exposed, or enabled together, and their dependencies on other features may be selected dynamically by accessing configuration information from a Web portal or manually entering feature overrides prior to starting a new test. Features may be exposed based on user profiles.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment, or to different or mutually exclusive embodiments. Features of various embodiments may be combined in other embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

In an embodiment, various audiences may be targeting during test automation. New features may be exposed to pre-selected audiences during test automation. A feature may be identified as belonging to a certain audience, and whether it is dark or exposed. The code for a dark feature may be part of the build for that audience, but the feature is gated off, as described more fully below. Thus, testing of a dark feature may ensure that the feature can be gated off, when necessary, for instance, for compatibility issues with other features, for a software build, without having to remove the code from the build. An exposed feature may be one that is included in the software build code, and gated on, or enabled. In at least one embodiment, feature(s) that are scheduled to be included in the build for an audience may be tested in an automated test environment with the features associated with that audience. The feature sets in the test may be selected based on the audience and other features associated with that audience. When a feature has been sufficiently tested with an audience and considered successfully integrated, that feature may be identified as being ready for deployment to that audience in a configuration database.

The subject matter disclosed herein allows a test team to "A/B test" features with various client builds. In an embodiment, a feature is tested for a specific audience with other features associated with the specified audience. Effects of rolling out new features may be isolated with respect to a base build, by successively testing with smaller sets of new and stable features. A base build may be a software build for an audience and channel which is deemed to be fully integrated with the features associated with the build, where each integrated feature has passed test and the build is considered stable to deploy to the audience. In existing systems, it is difficult to test the many dynamic features on top of a stable client build. Existing systems typically do not ship software builds with varying and different features to many different populations, or audiences, due to the enormous effort required for quality testing. In the past, if a bug was found in a feature, it might force the developers to go back to the beginning of the test process and delay deployment for a significant amount of time, to back out the faulty feature.

FIG. 1 is a diagram illustrating feature gates in software builds, according to an embodiment. A platform 100 is shown having an installed application 110. The code for application 110 may include feature gate code 111, 113. As described herein, application code may have software hooks in the code that define operation of a feature based on externally defined parameters. These software hooks may be referred to as "feature gates," because a feature may be gated on or off, and/or specific parameters may be gated to A/B values. In an example, application code 110 may include feature gates 111 and 113. A feature gate is an internal on/off gate, or A/B gate. In some instances, the gate may turn the entire feature on or off. In another example, the gate may define a specific parameter for runtime, such as a timing of fast or slow for an operation (e.g., 5 ms vs. 100 ms), or something as simple as color for an alert (e.g., red vs. black).

In an example, feature gate 113 may also be associated with two optional variables, or operational parameters. These operational parameters may be referred to as treatments. In this example, feature gate 113 may have two possible treatments, T1 and T2. For software that is heavy with user experience or user interfaces, successful testing may be dependent on user perception rather than just faults. For this type of system, there may be hundreds of dynamic features, with various treatments possible for each feature, that may be on or off, or A/B selected, at varying percentages. This type of testing requires a more complex environment than previously available in traditional software development and test environments.

In an embodiment, source code 110 for a software build may include feature gates 111, 113 for specific features. The code may include a class used for the A/B testing. In an example, the A/B testing class is the AB_t class which represents an object having an associated value, where the value may differ depending on various client, or platform properties. The values may be determined by the Scope and feature settings for the user/client. In an example, features relate to A/B values and treatment codes. Scope may relate to things such as audience, language or other configuration settings. The context for features, A/B values, platform, etc. that define a specific build may be referred to as a flight. A Scope may be defined by code/binary in the software build. A flight, on the other hand, may be defined when a configuration is received from the Web portal, or configuration system. A vector of value-Scope pairs allows for defining values to be used for specific Scopes. A Scope value may be used in the absence of any dynamically configured value for this object. If the condition specified in a given Scope is satisfied, then the object holds the corresponding specified value.

In an embodiment, a Scope may be evaluated from left to right, and therefore the object may hold the value specified in the first Scope that satisfies the specific condition. Left to right refers to the vector of value-Scope pairs that allows for defining values to be used for specific Scopes. In absence of a dynamically configured value for a feature, the pairs may be evaluated in this vector from start to end (e.g., left to right), and the first pair for which the Scope evaluates to True, the corresponding value is assigned to the feature. A default value may be used when none of the Scopes satisfies the condition. Each AB_t object may include a feature name to be matched with flights received by the client. These flights may either send the entire object that the AB_t object holds, or the flight may send a reference to one of the predetermined values specified within AB_t. In an example, a flight, or selected combination of features, may be consistent throughout a session. In other words, features in the software may remain active/inactive until a new session for the software application is begun. In an embodiment, the AB_t class is effected using an application program interface (API).

Constructors may be used in the code 111, 113 to construct an object of type T in the AB_t class where value of the object type T may be configured dynamically. A default value may be used if there is no configured value. The constructor may include parameters such as feature-name, default-value, possible-values, Scope-values, etc. An operator T( ) may return a value used to get the value associated with the specified feature/setting. This value may vary depending on conditions within the current session. In an example, conditions may include feature override, registry override, server side configurations, Scope/value pairs, or others. Various types of overrides may be available based on where the override is set, e.g., client, server, audience-based, etc. In an example, a feature override may be based on an API, which may override a feature in a test framework. A registry override may apply when a developer sets an override in a registry key to override a feature value and test different behavior. A server side configuration may be the flight configuration system on the server side.

In an example, when various conditions are mutually exclusive, the precedence order of these conditions may be pre-defined. Other classes may be available to provide different audiences or feature sets based on other criteria. For instance, a Boolean class may be available to simplify the objects that do not require A/B testing.

In an embodiment, the new features are included with the compiled and linked software for the base build. However, the feature gates 111, 113 are set as on or off (e.g., enabled/exposed or disabled/dark), and if there are corresponding treatments for a feature, then applying the appropriate parameters for the treatment, as discussed above. In traditional software development, features that were not yet ready to be installed in the final deployment may have been included as a stub code. Various techniques for stubbing a function or module have been widely used by programmers for many years. However, code that has been stubbed out may not be tested until the full code is compiled and linked with the base build. A stub typically existed as a complete replacement for the module or feature that was not ready for deployment. Thus, testing these features manually by stubbing the code, and recompiling each time a stub is inserted or omitted, is time intensive and prone to delays in schedule when there are bugs found.

A software build may use defined parameters to dynamically configure the feature gates in several ways. In an embodiment, when the software build is installed on the platform 100 the feature gate parameters may be stored in a database or system registry 120 on the platform 100. In an embodiment, the platform may be a device having an architecture that does not use a system registry. In this example, the database may emulate a system registry, or retrieve feature and configuration from a database communicatively coupled to the platform. The database may be directly connected, or accessed over a network. The software may determine whether the features are exposed (e.g., enabled) at runtime, by retrieving the parameters from the database/registry 120. In an embodiment, the features may remain static during testing for a specific audience, as defined by parameters stored in an experiment and configuration system, as described below. Each feature may have a default value in code. Feature gates and AB_t objects may have a default value in code/Source Depot in case access to a Web portal (e.g., network accessed database) is unavailable. Overrides may be present in the registry, or local database 120, so that a value may be returned when called. The values retrieved from network database and registry may take precedence over the default values stored in code.

In an embodiment, the parameters may be sent to the platform 100 using an application program interface (API) 130 or a command line interface 140. In an embodiment, the command line interface 140 or API 130 may provide feature gate overrides, or flight information to a feature gate interface 175. The feature gate interface 175 may reside on server 150 and take the command line or API models and help build the database/registry 120. The feature gate interface 175 may also act as a Web portal for API calls in the application code 110, and accessed over network 160, to provide configuration and flight information during runtime. The platform 100 may communicate with server 150 via a local or public network 160. In an embodiment, the configuration parameters may be stored in database/registry 120 during installation of the application on a test machine. In an embodiment, feature configuration parameters may be stored in the database/registry 120 during installation, but may be dynamically overridden during runtime based on a platform, user, audience, or channel designation to be used in the feature gate 111, 113. In an embodiment, feature gate parameters may be retrieved from the server 150 (e.g., from the feature gate interface 175) during launch, runtime or installation. If the server 150 is unavailable, default parameters stored in the database/registry 120 may be used.

The concept of folding in one or more new or updated features to a stable base software build may be referred to herein as "feature rollout." Various feature rollouts may be dynamically disabled to fix an issue (e.g., bug or poor user experience) found in testing, and may result in little or no delay in the release of the client build. An embodiment, as described herein, provides a process that allows the development and testing teams to assess if an issue was due to the base build (which may require a code fix and a new build, including a new test cycle), or due to one or more feature rollouts (which may be quickly mitigated by turning them off).

In an embodiment, source code 110 for the software build may be implemented in a specific language such as C# for various platforms and operating systems. Feature gate APIs 130 may also be implemented in C# for ease of interoperability. For instance, source code may be the same for a platform 100 running a Microsoft® Windows® operating system (OS), a mobile device running Android™ OS, or a device running Apple® iOS® or MacOS™ OS. In an example, for instance, the Android™ OS application user interface (UI) components make use of native platform capabilities and thus, they may be implemented in Java® code. A Java® wrapper layer may be used for an implementation of Feature Gates 111, 113 for Android™ devices. In an embodiment, the Java wrapper layer internally may call into C# Feature Gate APIs 130 using Java-Native Interface (JNI).

Figure 2A:
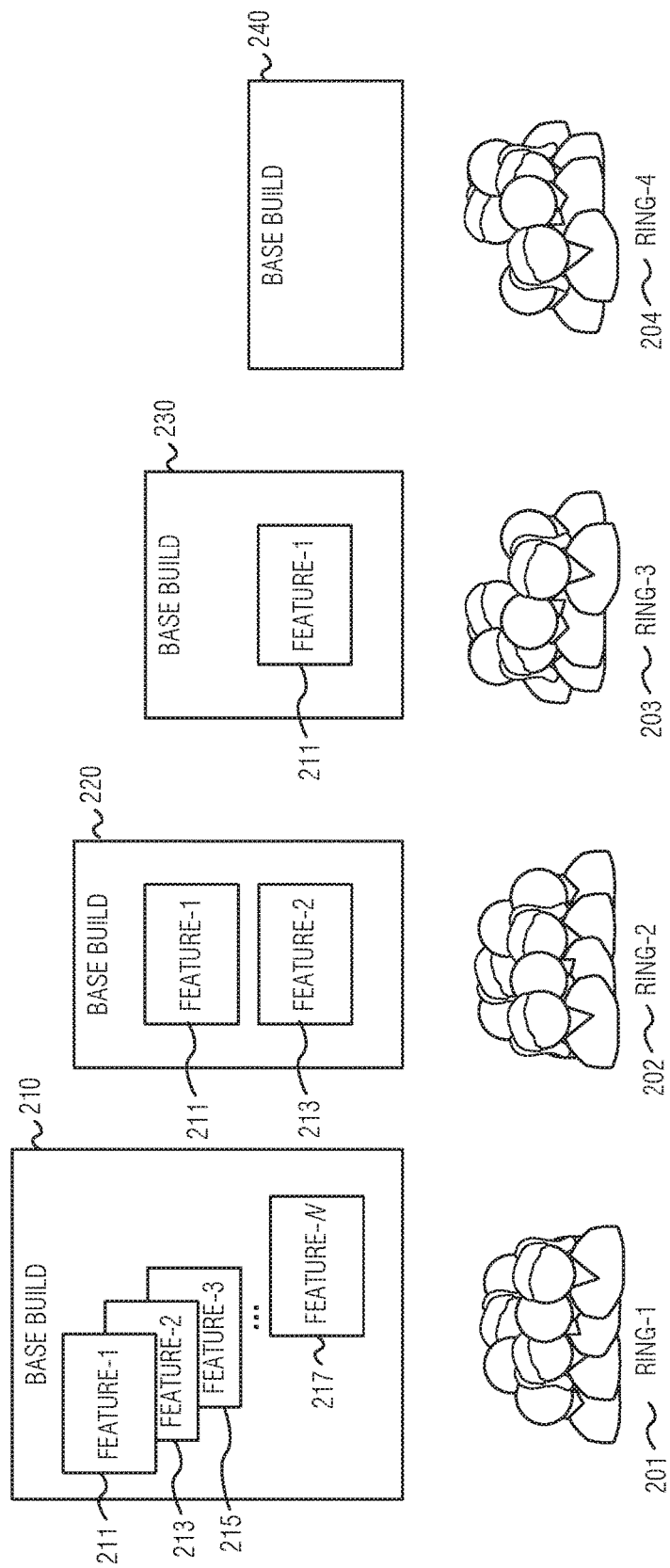
FIG. 2A illustrates various audiences of users and how an audience corresponds to a build version, according to an embodiment.

In an embodiment, a software system may be deployed to different populations, or audiences, based on the sophistication or familiarity that the users of the audience have with this software system. An audience may be referred to as a "ring," for conceptual purposes. In the discussion herein, the terms audience and ring may be used interchangeably. FIG. 2A illustrates various audiences of users and how an audience corresponds to a build version, according to an embodiment. In an example, a system may be deployed to four rings, ring-1 201, ring-2 202, ring-3 203, and ring-4 204. In the illustrated example, ring-4 204 represents the audience of end-users that receive the base build that has been fully tested and is operationally stable 240. Ring-1 201 represents a user audience of the developers who may be creating any of features 1-N (211, 213, 215, 217) and may need to test their team's feature with the base build and with other teams' new features 210. Depending on the size of the software system and how many different sets of users are available to test various features, an enterprise may have more than, or fewer than, the four rings, or audiences, as illustrated. In this example, ring-2 202 may represent a ring that is to receive the base build plus features 1 and 2 (211, 213) as build 220. This ring may correspond to a larger group that is internal to the development team or enterprise, so that discovered bugs have less of a risk associated with end-users. In some environments, a subset of the end-users may choose to opt in to receive advance deployment of new features, and assume the risk that there are bugs. In this example, ring-3 203 may represent an audience of end-users that have opted in to advanced deployment. The build for ring-3 203 may include the base build and feature 1 (211) as build 230.

In an embodiment, test engineers or developers may impersonate an audience, or ring, in the test lab, in order to test new features for that audience. In this context, impersonation means that the test engineer sets up a test run as if the build were associated with the impersonated audience. Impersonation allows features to be tested, or exposed, in builds that would by default not include that feature. For instance, if a feature has not been fully tested in ring-1, it should not be included in ring-2. However, a development team may wish to test their feature only with features that have already been promoted to ring-2. In this case, the test engineer may select ring-2 as the audience, thereby impersonating audience ring-2, and enable the desired feature, thus overriding the usual test defaults for specific audiences.

Figure 2B:
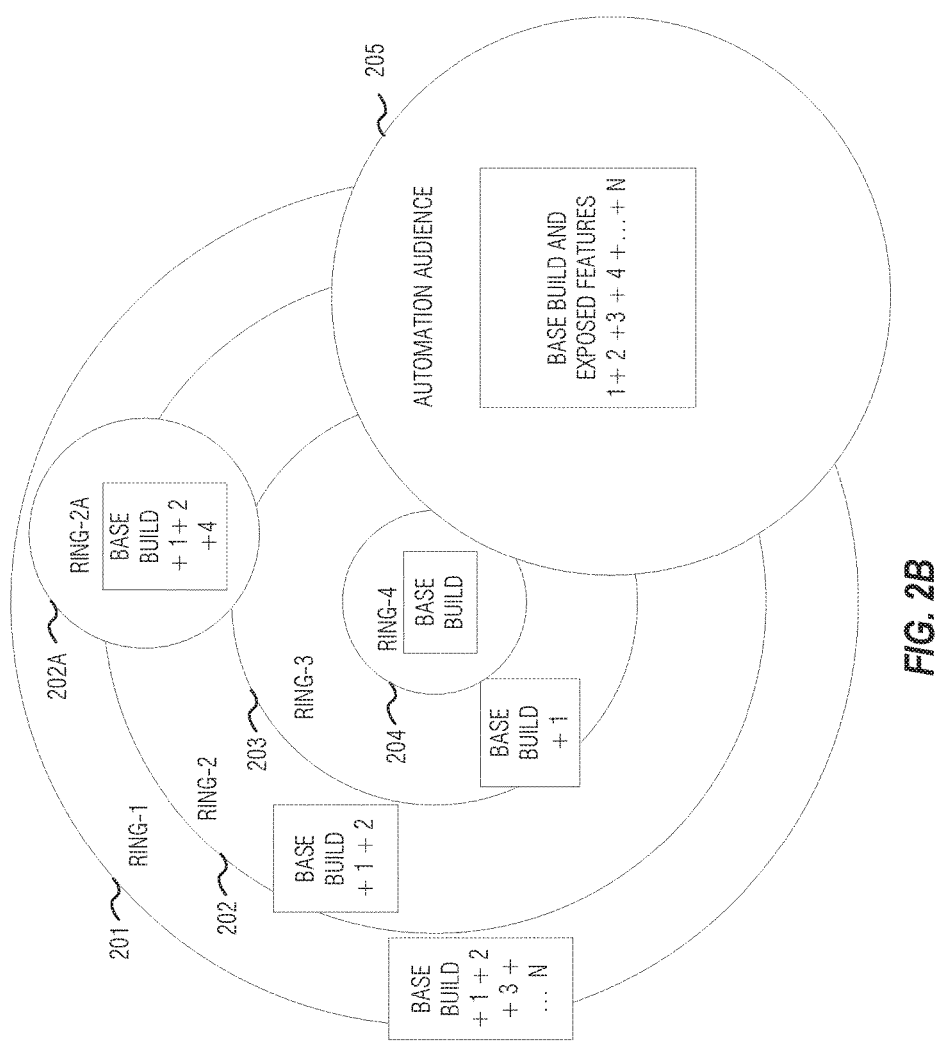
FIG. 2B illustrates the ring audiences to show conceptual concentric rings, according to an embodiment.

FIG. 2B illustrates the ring audiences to show conceptual concentric rings, according to an embodiment. FIG. 2B illustrates the ring audiences as shown in FIG. 2A (201-204), and also includes an additional ring-2A 202-A. In this example, ring-2A 202-A includes the base build and features 1, 2 and 4. It may be seen that ring-4 204 is the smallest concentric ring, and excludes features that have not been fully tested. This smallest ring-4 204 is designated the base build that will be sent to the general end user audience. It should be understood that as features are fully tested and promoted to the innermost ring-4 204, the tested and stable features will become part of the base build. The outermost ring, ring-1 201 may include many optional features under test and experimentation. As the ring gets smaller and closer to the base build, the code and features are expected to be more stable and tested. Audiences may be thought of as being at various stages of the development lifecycle, with the innermost ring being the final and most stable stage.

In an this example, an automation audience 205 is also shown. The automation audience 205 represents an audience for testing in the test automation lab, but does not correspond to a ring. Default and optional features may be selected based on a desired automation test and be disparate from other existing audiences. In an example, the automation audience 205 represents combinations of features to be exposed that may not be planned for immediate deployment to usual audiences, or real users, but only exists as a test build. In an example, a test engineer may select the automation audience 205, to initiate an automation test with the pre-selected features. Thus, testing may be performed for an audience that would not normally have existed as a deployed build in the lab, and developers may test features for an audience outside of the normal test cycle. This allows the developers to identify bugs or issues with the new feature code before the feature, or combinations of features, are deployed to end users.

In an embodiment, feature rollouts at every stage of the development lifecycle have lower probability of having fatal errors because the features are validated at each ring in both an on and off state (e.g., exposed and dark). A feature may not be promoted to a next innermost ring until it has been validated in an outer ring. Integration and development is enhanced because teams have the ability to test with features that have not yet been completely rolled out. In a traditional development and test environment, each team would include their feature in the base build and then test to see if that build is stable. However when there are dozens of teams working on various features, there is no way in the traditional model to test a feature against a different feature that has not yet been integrated into the build. In an embodiment, a development team is able to test their new feature in the test lab environment before it is ready for deployment, by selecting the automation audience. For instance, if the development team for feature 4 wants to know if their feature will work with features 1 and 2 the) may include the feature in the pre-defined automation audience 205.

In an embodiment, a configuration database may be used to track feature development and applicable audiences. For instance, when a feature is first entered or checked in to the configuration system, it may be associated only with ring-1 201, the outermost ring. When an automated test run is generated, an audience is selected. In an example, when ring-1 is selected, the configuration database may be queried to identify all features that are associated with ring-1 and include them in the test build, by default. In an example, when a feature is tested and stable with ring-1 201, it may be exposed and associated with ring-2 202. The configuration settings for that feature may be identified in the database as being exposed for both ring-1 201 and ring-2 202. Thus, when a test build is generated for ring-2 that feature may be exposed in the test build for ring-2 202, by default.

There may be several channels of deployment to various audiences. A test build may use both audience and channel designation to identify appropriate configuration settings and exposed features or treatments. For instance, an end user in the audience corresponding to ring-4 204 may be scheduled to receive the base build. Some end-users may prefer a different update schedule. For instance, one channel of users may prefer a monthly update with bug fixes and new features. Another channel of end-users may prefer the same build but only every six months, for more stability. Other channels may be related to validating feature readiness. For instance the term "fork" as used herein represents the channel that includes feature rollouts that are ready to go all the way to a production system, or end-users. Before a feature is ready to be in the fork release, it may conceptually correspond to a channel referred to as DEV, for a development channel. Both audiences and channels may be defined during test automation, to identify which build is being tested.

As discussed above, a developer may wish to include many new features in a fork release, where the features may be developed by disparate teams. Testing a feature with every permutation of other features is often neither desirable nor feasible. However, a development team may wish to test their new feature with a build designated for a select audience, and with features to be rolled out to that audience. In a usual test scenario, a team's feature may be tested in ring-1 and be rolled out only with the features gated on for that audience. In an example, the development team may want to test their new feature with features to be rolled out to ring-2. In this example, the ring-2 audience may be impersonated in the lab to test the new feature with audience ring-2, even if the feature is not ready to be promoted to ring-2.

In an embodiment, a developer or test engineer may wish to test a new feature with all or most of the features that have been exposed in any ring. In this case, an automation audience may be used. In an example, the automation audience does not correspond to any actual user audience or build that will be deployed to an audience of users. The automation audience is a construct to allow new features to be exposed with other features, associated with any ring, in order to test for interoperability and other operational issues. In an embodiment, when the automation audience is selected, any feature that is identified as being exposed or authorized for any ring may be included as exposed, or enabled in the test run. If the test engineer or developer knows that one or more features are mutually exclusive or cause known problem when operational at the same time, then one of more features may be gated off in the test build to override the default.

Figure 3:
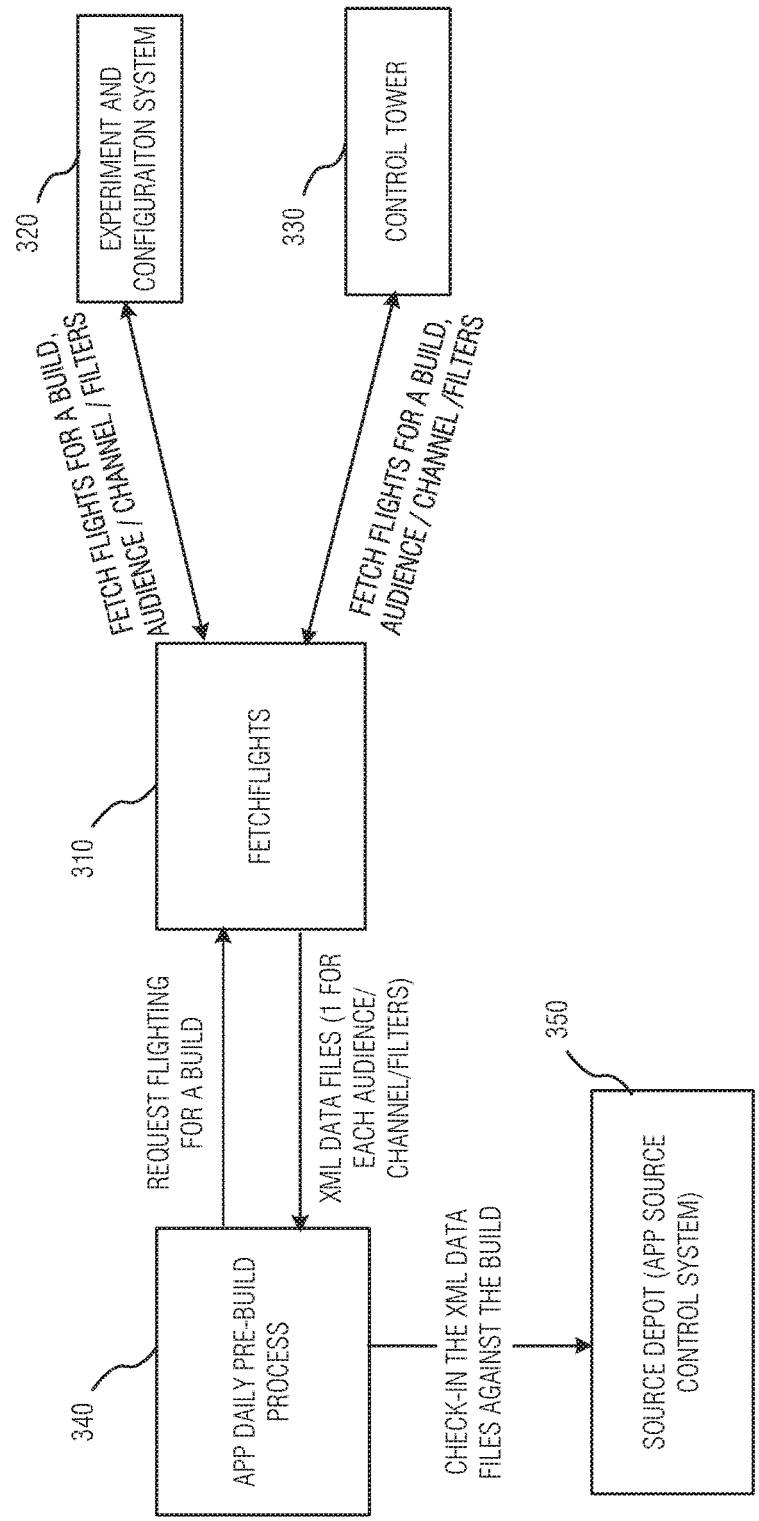
FIG. 3 is a diagram illustrating a build with selected flights or feature/configuration combinations, according to an embodiment.

FIG. 3 is a diagram illustrating a build with selected flights or feature/configuration combinations, according to an embodiment. In an embodiment, XML, or other data files, containing flight information (e.g., feature combination, platform, audience information, etc.) may be applied to different builds using an automation build process, module or logic. In an example, the base build may be re-run on a daily basis to include fully tested features or to exclude features that have failed testing. Other builds may be deployed for selected audiences, with different active features, and specific to different platforms and/or operating systems, and architectures. Before deploying a build to the target audience, the build may be tested in an automation test run.

In an embodiment, automation test runs may be performed on a daily, or other periodic basis using the automation build process. As part of the daily pre-build process 340 for an application, an engine, or software process, herein referred to as FetchFlights engine 310, may be invoked by providing it an upcoming build number/identifier as a parameter. In an example, there may be two sources from which the engine 310 fetches the flight information: either the experimentation and configuration system (ECS) 320 or the control tower (CT) 330. FetchFlights engine 310 may use a representation state transfer (REST) compliant API to fetch the flight information for the given build number from ECS 320 or CT 330 for different audience/channel combinations. In an example, ECS 320 may be used by a development team and CT 330 may be used by test automation engineers. The configuration system (e.g., ECS or CT) may be specific to an engineering team and have custom configurations defined that are specific to that team. In an embodiment, there may be one, two, or more than two configuration systems (320, 330) coupled to the server and each configuration system may be used for different testing purposes, or by different teams.

After retrieving the flight configurations from the server, FetchFlights engine 310 may segregate the data on different parameters such as platform, architecture, application. The features that are not to be included may be filtered out or have their allocation percentage set to zero. When a feature is filtered out, the featureGate is gated off; therefore, the code path to enable the feature is never executed. In an embodiment, the FetchFlights engine 310 may generate an XML, or other data file, for each valid audience/channel combination, for automation testing. It should be understood that file formats other than XML may be used to transfer the information to the pre-build process 340. In an example, the XML file may use a naming convention such as flights.<audience>.<channel>.xml to distinguish the specifics of each build, for instance for feature combinations (e.g., flights), audience and channel.

The XML files generated by FetchFlights engine 310 may then be checked into the Application Source Control system (Source Depot) 350, as part of the pre-build process. Source Depot 350 may help manage version control. The Source Depot 350 may be used as a central repository for the product source code. Checking in the XML file allows test runs to access the information, and may tie the feature information with the build by storing the product code in the XML file. Developers may use the ECS/CT portals 320, 330 to change the feature setting for a given build. However, this may at times result in inconsistency in automation runs because different runs against a given build may include different feature settings. This may make debugging extremely difficult. In an embodiment, the feature settings corresponding to a given build may be checked in to the source control system 350 so that all automation runs against that build use the same feature settings.

In a typical automated test environment, testing may be performed on builds that have been defined for a particular audience and build, where the build is to be deployed to users in the audience. The ability to generate an automation audience allows the test engineers to build tests and configure test machines having combinations of features, both dark and exposed, that do not exist for end-users in any audience. For instance, in an example, a test engineer selects a channel and audience in a command line to commence test automation. In an embodiment, command line parameters for a batch file (e.g. lab.bat) may control the state of feature, settings, and featureGate objects in the application code. In other test environments, these objects may have been set by a direct call from the client to a configuration service. By moving the identification of settings and configurations to a command line these objects may be configured consistently throughout a test run. The command line usage may also allow the test engineer to reproduce previous runs using the same feature rollout configuration. Relying on flight data in the configuration system to configure the features may be harder to track when changes are made to an underlying audience configuration. However, the command line option may be saved for future use and reference.

In an example, a convenience API may be used to return configuration information to match given parameters. For instance, an XML command line:
    config.edge.appln.com/config/v1/OAuto/
        0.0.0.0?&Channel=CC&Audience=RING-3
may return every feature rollout associated with a current channel (e.g., CC channel) and a ring-3 audience, regardless of how other filters are set. In this example, a configuration would not be returned if the API call does not specify a filter that the configuration has set. In another embodiment, an API may return all of the feature rollouts matching the given parameters, irrespective of whether the rollout has additional filters set. In an embodiment, a command line with separated feature-value pairs may be used for a particular run, such as:
    lab_run-set        featurevaluepairs="<featureName1>:
        <value>, <featureName2>:<value>, . . . "
where the featurename-n represents the nth feature and <value> represents a value for feature n, such as on/off, A/B, etc. For features that have a string value, or other non-Boolean value, a command line may include the value type as well as the value. For instance, a vale pair may be expressed as <featureName>:<value>:<valuetype> as in "ApplicationName:feature-n:string."

In an embodiment, the FetchFlights engine 310 may perform the REST API calls once per day. The command line interface used by testers may make use of the information retrieved from the FetchFlights result rather than conducting a new REST API call prior to each test.

In an embodiment, the API may be invoked from a Tasklib library. In an example, Tasklib is a library in C# that may be used for end-end automation testing. A Tasklib library may have code to perform test infrastructure setup, test execution, and test cleanup. Each application team may have its own version of Tasklib. APIs in C# (e.g., SetFeatureOverrides and RemoveFeatureOverrides) may be invoked from the Tasklib to set feature overrides in automation. The overrides set using this approach may be applicable only for a specific test rather than all the test scenarios. In contrast, a command-line approach may set feature overrides for all test scenarios in a test session. Any overrides set using the Tasklib method may take precedence over the overrides set using the command-line parameters. For instance, a function may be invoked to set feature overrides that is defined in a configuration setting library. This option may use a dictionary of the featureName and value pairs as the parameter. In an example, a Tasklib invocation may use a syntax such as:
    SetFeatureOverrides(IDictionary<string,
        int>featureNameValueList).

In an example, a feature override may be selected for only a specific application, and not the entire product build. For instance, the following API function invocation may be used to override application appName:
    SetFeatureOverrides(IDictionary<string,
        string>featureNameValueList,   bool   isForAllApp,
        MATE2.AppName appName),
where is ForAllApp should be false and the appName should be the software application for which the test engineer desires to add the override (e.g., MATE2.AppName.PPT override). For instance, if is ForAllApp is set to false, the feature overrides may be applied only to the application specified using the appName parameter. The other applications may use static Scopes to evaluate the value of the corresponding features. The API that uses an int value-type may be used for overriding Boolean FeatureGates. The only values that may be used with a Boolean type are 0 (e.g., False) and 1 (e.g., True). To override a FeatureGate with any value-type, an API using a string value-type and featureNameValueList may be used. This API may be used to override featureGates with Integer, String, Boolean and Index type values. In an example, the dictionary key may be the featurename and the value may be in the following format value:type, where "value" is the feature value to override and the supported values for "type" are Integer, Boolean, String and Index. The API using a string value-type is a more flexible call that allows for multiple value types.

In an embodiment, if the feature/value pair is not provided as a lab test command-line parameter or as an argument to Set FeatureOverrides, the default features fetched from configuration system for that audience/channel combination take precedence. If a feature/value pair is provided as a lab command-line parameter but not provided as an argument to Set FeatureOverrides, the value provided as the lab test command-line parameter may take precedence for that particular lab run. If a feature/value pair is provided as a lab command-line parameter as well as an argument to Set FeatureOverrides, the value that is supplied through the SetFeatureOverrides API will take precedence for that particular lab run.

In an embodiment, an automation test run may be triggered with the following:
    lab_run-set "audience=Automation".
For this run, all features with audience filter set to automation on in the configuration system 320, or CT 330, and build filter matching the checkpoint, or build number, against which the run is triggered, are to be applied for that run. In the case when no audience filter is set, it may be assumed that the feature is applicable for all audience rings, and may be applied to the test run. Features may be further segregated based on platform, architecture and application for each scenario. For instance, if the scenario configuration corresponds to platform=Win32 and architecture=X64, only the features matching the corresponding platform/architecture values may be applicable for that particular scenario run. In an example, a test run may apply to a specific application. In this scenario, any features specific to the application may be applied. In an embodiment, a percentage allocation may be associated with a feature for A/B testing throughout an audience, where a percentage of audience members are exposed to the feature and some percentage of audience members have a dark feature, instead. All features with allocation percentage greater than zero may be exposed or enabled for the test run. Hence, even if a feature rollout is targeting only 33% of the users in an audience, the feature may be exposed in 100% of automation runs, provided there is a match for the other filters. In an embodiment, for impersonated and automation test runs, parameters/filters retrieved from configuration system 320 or control tower 330, other than the audience, channel, build version, platform, architecture and application, may be ignored. For example, if a feature has language filter set to ja-jp (e.g., Japanese), the language filter may be applied for scenarios targeting language en-us (e.g., American English), also, as long as there is match for the filters that are honored. In some cases, only certain filters such as audience, channel, build version, architecture, and application name may be relevant. Matching a filter means that the filter value is a valid value for the feature to be turned on. For instance, if the feature is meant for a specific application A, and the test is running application A, then the filter may be matched. Some filters, such as language, may be disregarded for the test run. In an example, the behavior in an automation run may be very similar to a build of a deployed client application.

In an embodiment, the automation audience is an audience for which there may be no distinction between the fork production build channel and the DEV development build channel. Thus, in certain embodiments, a channel parameter should not be used for the automation audience. In an embodiment, any value identified for the channel, when automation is selected as the audience may be ignored.

In an embodiment, new features may be developed that must be exposed for other specific features to be tested. In other words, some features may be dependent on other features. A feature may be made statically exposed via a featuregateoverride parameter. In an embodiment, this parameter may be an internal API call used within test run code to turn on a feature. In an example, the feature may be turned on programmatically during runtime without input from the Web portal or configuration system, command line, or the XML file that gets checked into Source Depot. In an example, the test engineer may be notified by the development team that feature A must be exposed for an automation run with feature B. In an example, dependent features are turned on together manually using feature value pairs. The dependency may also be identified in the configuration database in a flight, to automatically expose the feature depended upon. In an embodiment, when the test team identifies a dependency between or among features, for instance that feature B fails when tested without feature A, this dependency may be recorded and saved in the configuration system or control tower as a flight. In another example, the dependency may be performed as a manual override.

Figure 4A:
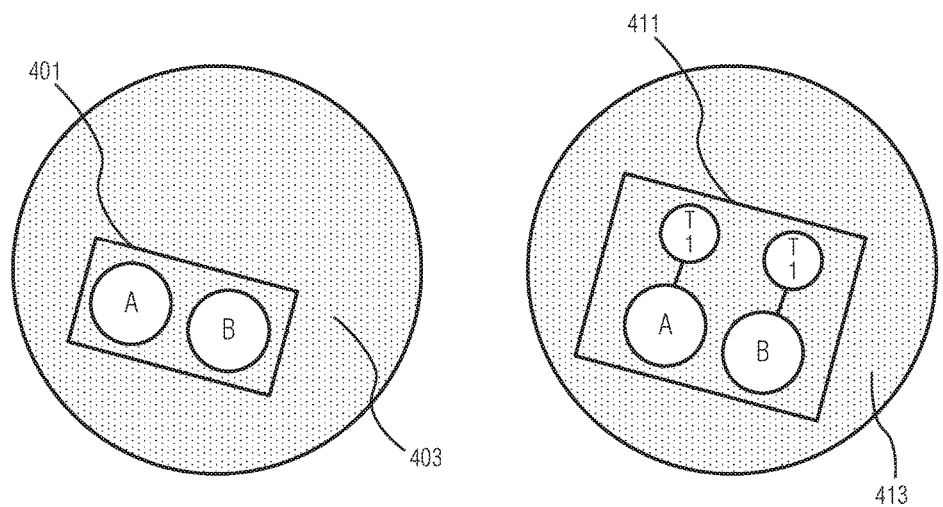
FIG. 4A illustrates default behavior for lab test automation, in an embodiment.
Figure 4B:
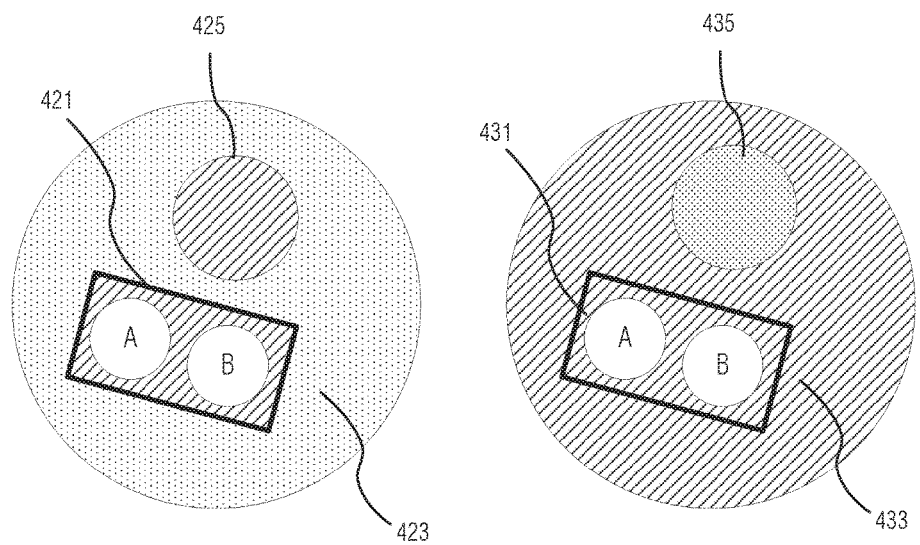
FIG. 4B illustrates audience support with static features enabled based on an audience selection, according to an embodiment.
Figure 4C:
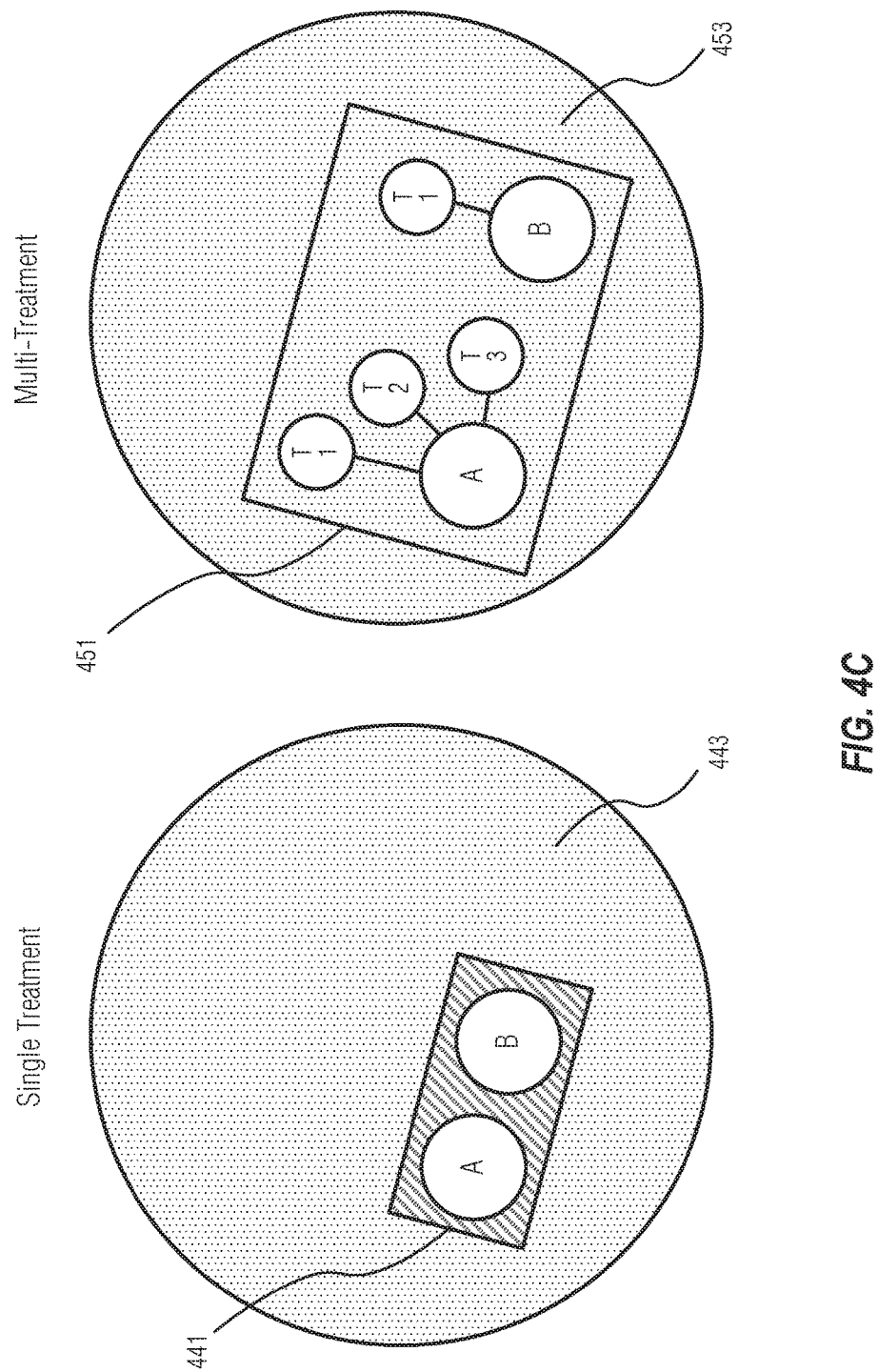
FIG. 4C illustrates a feature override support for a both single treatment and multi-treatment, according to an embodiment.

FIGS. 4A-C are diagrams illustrating testing of features for specific audiences, according to an embodiment. In an embodiment, dynamic feature gates may be disabled by default for a specific audience. Thus, the feature gates must be explicitly turned on for specific test runs. In an automation audience run, features may be exposed, or enabled by default. A feature gate may be exposed based on parameters or filters set at the time the automation run is invoked. For instance, a feature may be turned on by a command line, XML file, or Tasklib. Tasklib is a TSO command processor. TSO (time sharing option) and ISPF (Interactive System Productivity Facility) are software environments that may be used by test engineers to create, store, print and delete data sets and to submit and examine test jobs. In an embodiment, the default behavior of a lab automation test run may include dynamic features that have been shipped to production audiences, as a baseline. An automation test run may activate all features exposed to any audience using a command line run or Tasklib option to enable testing of one or more features against all other features in the application code base that are exposed to an audience. This capability enables teams to complete a regression test against the automation audience/ring before promoting their feature to the next ring.

In an embodiment, a test automation run may selectively test multiple combinations of dark deployed features (or treatments against) to test dependencies and interaction effects with the option to specify an audience. Features to be activated for a given lab automation test run may be previewed before start of the test run. Formalizing the selection and test automation of selected features to an automation audience allows issues to be reproduced by re-running the automation run with the same settings or filters (e.g., same command line, XML file, Tasklib). Failures may be further evaluated by identifying which features were activated in a specific lab test run.

In an embodiment, in an automation test example for a specific audience, the default behavior for lab automation may be illustrated in FIG. 4A. In an example audience, all dynamic features may be disabled, as indicated by circle 403. Dynamic features A and B are made dark 401. In other words, the tested code includes the features A and B, but they are gated off. Features A and B with treatment T1 411 may be tested in the automation run by overriding the dark default, with other dynamic features disabled 413, for the selected audience.

FIG. 4B illustrates a current audience support with static features enabled 425, based on an audience selection. Features A and B may be gated on with an override 421, but other features are still disabled 423. A new audience test run may include dark feature overrides 431 and static and dynamic features enabled based on audience selection 433. In an example, specifying a channel C1 and audience A1 (herein, C1/A1 combination) may result in all features exposed to A1 to be activated 433. Features that are not active in C1/A1 435 may not be activated (e.g., gated off). In cases where multiple configurations are available for a single feature rollout, the system may select the configuration that is exposed to the highest priority configuration for the build that is being tested, if there is an intersection between configurations (i.e. the multiple configurations apply to a single client based on audience/build filter selection). For instance, if there is a configuration for both audiences ring-3 and ring-4, one from the command line and one from the configuration system, the configuration for ring-4 may be selected as an innermost ring, or higher priority audience.

FIG. 4C illustrates a feature override support for both a single treatment and multi-treatment, according to an embodiment. In an example, features for a lab test run for a subset of filters including audience, channel, platform and architecture may be selected. Filter support for other lab automation filters may be selected, as needed. In an embodiment, a team may override or edit settings, for instance, using a text file or command line parameters. To test features for an audience that has not yet deployed the feature, impersonation of an audience provides A/B experimentation capabilities. For instance a single treatment of a feature is shown for features A and B 441, as a dark feature override, where other dynamic features are disabled 443. A feature may have multi treatments 451. In an example 451, feature A has possible treatments T1, T2 and T3. Feature B has treatment T1.

To test multiple treatment combinations in an automation test run, the command line or XML file and Tasklib feature activation capabilities may be extended to enable activation of the dynamic feature and A/B experiment treatments associated with permutations as sequential lab test runs. For instance, testing features A and B with treatments as identified in 451 may include three individual and sequential runs. The first run may include feature A:T1 and feature B. The second run may include feature A:T2 and feature B. The third run may include feature A:T3 and feature B.

Figure 4D:
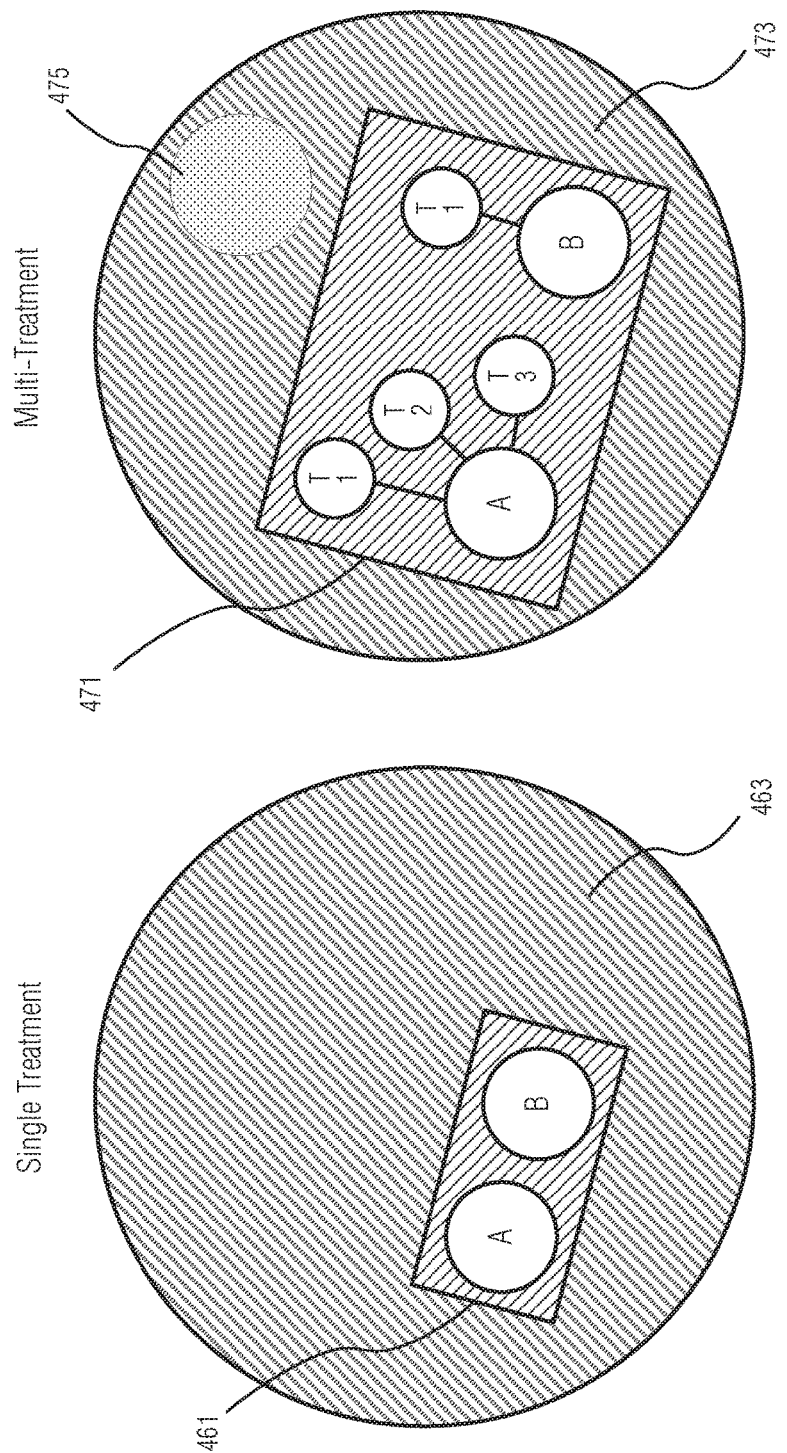
FIG. 4D illustrates a feature override support for automation audience runs for both single treatment and multi-treatment, according to an embodiment.

FIG. 4D illustrates a feature override support for automation runs for both single treatment and multi-treatment, according to an embodiment. In an example, features for a lab test run with the automation audience expose all optional features. The test run may select a subset of filters including audience (audience-automation), channel (ignored for automation audience), platform and architecture. Filter support for other lab automation filters may be selected, as needed. In an embodiment, a team may override or edit settings, for instance, using a data file or command line parameters. By default, all exposed features may be exposed for an automation audience. For example, features A and B 461 may be exposed with the automation audience 463, if these features are exposed for any other audience. Treatments 1-3 may be exposed for feature A. and treatment 1 may be exposed for feature B 471 for automation audience 473. During test, if any of the optional features or treatments fail, they may be turned dark or disabled 475 in the next automation test run by gating them off in the command line, as an override. Enabling features by default in the automation runs allows the test engineer to test features for an audience that has not yet deployed the feature.

Figure 5:
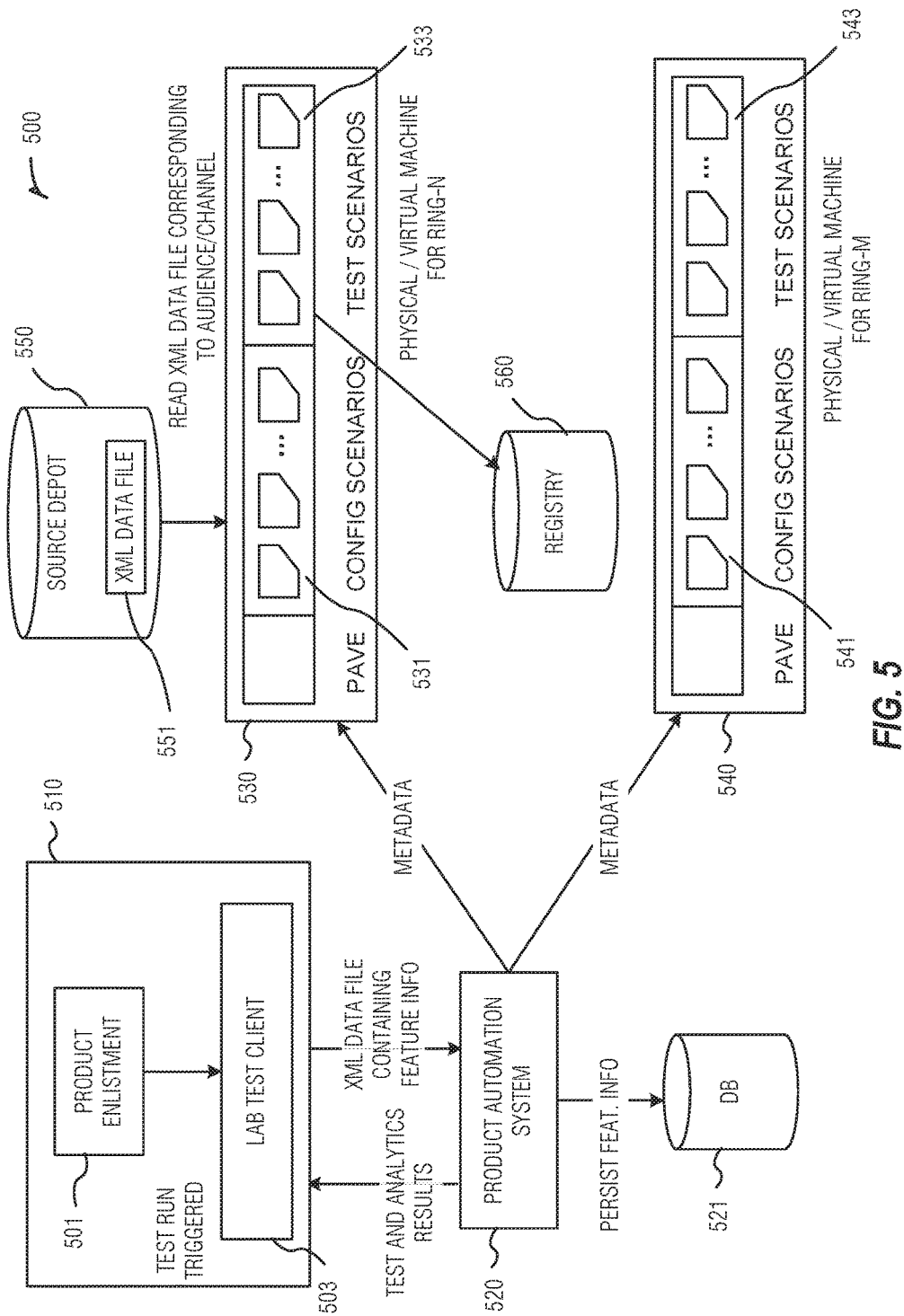
FIG. 5 is a diagram illustrating a test environment for building and testing the dynamic software with audience impersonation, according to an embodiment.

FIG. 5 is a diagram illustrating a test environment 500 for building and testing the dynamic software with automation audience, according to an embodiment. In an embodiment, test runs may use an automation lab for testing. An automation job may be triggered by an engineer using a tool for product enlistment, or product build tool 501 using a copy of the current codebase on a developer's workstation, by selecting an audience and channel using a command line. In an example, the command line may use syntax such as lab_run-set "audience=Automation" "channel=ChannelValue".

As described above, the channel designation may be ignored when the audience is an automation audience. The lab test client 503 on the test engineer's test platform 510 may then pass the audience information along with other metadata to a configuration build service 520 such as a product automation system, or automation service, as shorthand. In an example, the automation service 520 is responsible for commencing a test automation job by setting up different physical and virtual machines 530, 540. The automation service 520 may be used to execute a rich variety of automated test cases in a broad range of environments. The service may manage a large set of machine resources, automated test collateral, and execution history and results. The service 520 may configure the machines 530, 540 based on the test suite that needs to be executed. The service 520 may process and store the test results and report the results back to the client 503. The service 520 may pass on the automation metadata (including the audience/channel information) to the machines 530, 540 on which the test suite may be executed. Before a test, the machines may be wiped clean of previous data and configuration information, also known as being "paved."

Once paved, configuration scenarios 531, 541 may be executed by the machines 530, 540 to configure the machine depending on the test-suite to be executed. In an embodiment, the product applications may be installed as part of this step. The actual test scenarios 533, 543 may then be executed. As part of the setup phase for the test scenarios 533, 543, an XML, or other data file, 551 from the source control system, source depot 550, corresponding to the selected audience/channel may be opened and read. Depending on the platform/architecture of the machine on which the tests are executed, the corresponding flights may be picked up from the XML file 551 and then written to the registry 560, or other database, under specific application nodes, or a folder specific to an application rather than all applications. Flights may be stored in the registry under the application node for which they are applicable. For instance, if the path to the experimentation related registry settings is . . . / . . . /Experiment, then the features(flights) applicable for application App1 may be stored under . . . / . . . /Experiment/App1 and for application App2 under . . . / . . . /Experiment/App2. In an example, multiple applications may be installed on a machine, and the registry may be shared across Win32 applications. Thus, the flight/feature settings may be retrieved from the application specific node when the application is launched. When the test executes, it may read the flights from the registry 560 under the node corresponding to the application for which the test is configured and the flights are used for that particular test to validate different features.

In an embodiment, a development team may select the automation audience rather than an audience in the actual development or production ring. For instance, in an example, feature A has been fully tested in audience ring-1, as shown in FIGS. 2A-2B, but many features in the test are dark by default, due to interoperability issues, or bugs. The development team may wish to test feature A with all features which have been exposed in any audience/channel pair. In this example, the audience may be set to automation to expose all features which have been exposed in any ring. If it is known that feature N, for example, is incompatible with feature A, even though it has been exposed in at least one ring (audience), then feature N may be explicitly set dark and the defaults overridden. If treatments T1, T2 and T3 are all selected for a test, then the command line or XML file 551 may identify three sequential runs as audience automation, with Feature N dark for all runs. The command line settings and results of the automation test runs may be sent back to be stored in database 521 for post-test analysis.

An alternative embodiment may fetch flight information from an experimentation and control system, (ECS) for each automation run, rather than fetching the information only once for any given build, as described above. However, this alternative approach may get a different set of flights for each automation run for the same checkpoint, or build number. This may make debugging more difficult when failures occur. When the flight set is fetched only once for a given checkpoint, as part of the pre-build process, as discussed above, tracking of active flights and treatments is easier, and better for debugging.

During lab testing of the feature rollouts for the audience, the test engineer may retrieve a list of features to add or omit to the lab test run, as well as additional test scenarios, for instance when there are multiple treatments, via the XML files 551. The lab test client 503 may request the feature list and retrieve the features from a configuration management system, such as described in FIG. 3. For a baseline build (e.g., production audience), all new dynamic features may be gated off. During an automation audience test run, however, these new dynamic features may default to on if the feature configuration setting identifies that it is to be exposed in any audience. The developers may add other optional features that are default dark, and they may be identified in the XML file 551. In an embodiment, an XML file containing the feature information may be generated by the FetchFlights engine and stored into the codebase/Source Depot 550. The automation service 520 may read the XML file. Any persistent feature information, e.g., feature overrides specified via command-line or fetched from the XML file, may be added to database 521.

Testing may be performed on physical or virtual machines 530, 540. For instance, machines may be configured to test at different rings, or audiences, for instance the mth and nth ring, referred to generically as ring-m and ring-n. Machine 540 may be configured to test at ring-m. In an embodiment, ring-m machine 540 may be configured as the baseline device, and ring-n machine 530 may be configured to be the non-baseline machine. In an embodiment, machine 530 or 540 may be configured to run as the automation audience to test all ring level features. In an example, multiple test runs may be performed concurrently, on test machines 530 and 540. It will be understood that even though only two test machines are illustrated in FIG. 5 that more than two test machines may be present in the test environment 500. In an example, before running the automation test, the machine 530 may be first wiped of old data and configuration information (e.g., paved). The configuration scenario 531, as received by the automation service 520 may be written to a data store 560 coupled to the device 530. In an example, the data store used is the system registry 560. During runtime, the feature gates APIs may access the configuration information from the registry 560 to dynamically define whether the feature is on or off, and treatment or other settings, based on the configuration defined by the XML file.

Figure 6:
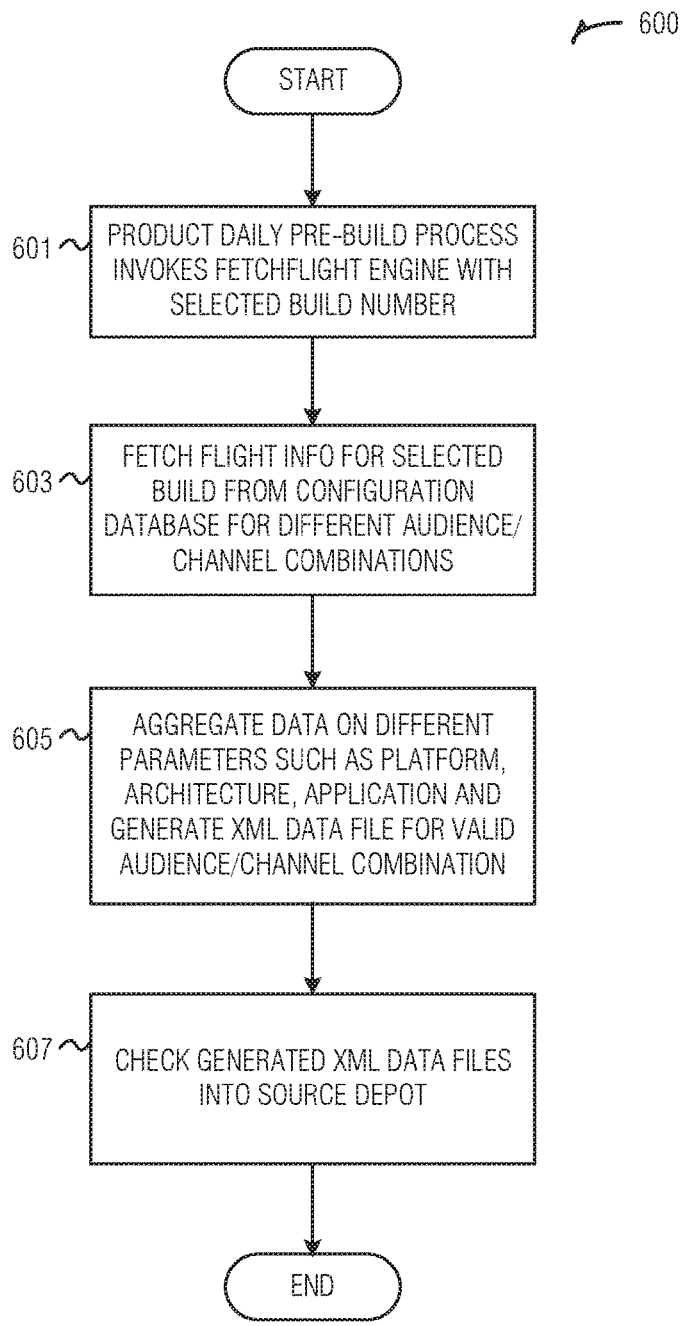
FIG. 6 is a flow chart illustrating a method for building an automation test run, according to an embodiment.

FIG. 6 is a flow chart illustrating a method 600 for building an automation test run, according to an embodiment. In an example, a product build may be re-run on a daily basis to include tested and optional or dynamic features or to exclude features that have failed testing. A pre-build process, in block 601, may invoke an engine or process (e.g., FetchFlights engine) to retrieve flight information based on the selected build, and audience. The pre-build process may be managed by an experimentation and test team. Different builds may be authorized for selected audiences, with different active features, and specific to different platforms and/or operating systems. The FetchFlights engine may retrieve the flight information based on the audience selected and any override information, such as feature and treatment combination tests, in block 603. The flight information may be retrieved from an experimentation and configuration system or control tower, in embodiments. The experimentation and configuration system and control tower may be services used for experimentation. A REST API may be used to fetch the flight information. A command line, XML file or Tasklib processor may be used to define the audience, channel and feature selection for the automation run. Data may be aggregated on different parameters such as platform, architecture, application and generate an XML, or other data file, for valid audience/channel combination, in block 605. The Fetch-Flights engine may generate an XML file for each valid audience/channel combination, with feature and treatment combinations, for automation testing. The XML file may include multiple test scenarios, for instance, when multiple treatments are to be tested for a feature. It will be understood that although this description refers to an XML file, for ease of discussion, the data file may be in another format, and may be generically referred to simply as a data file. The XML files generated by the FetchFlights engine may then be checked into an application source control system (e.g., source depot) as part of the pre-build process, in block 607. In an example, when the test engineer desires to test dynamic features that have been exposed in any audience, the automation audience may be selected to override differences in exposed features in the various rings or audiences.

Figure 7:
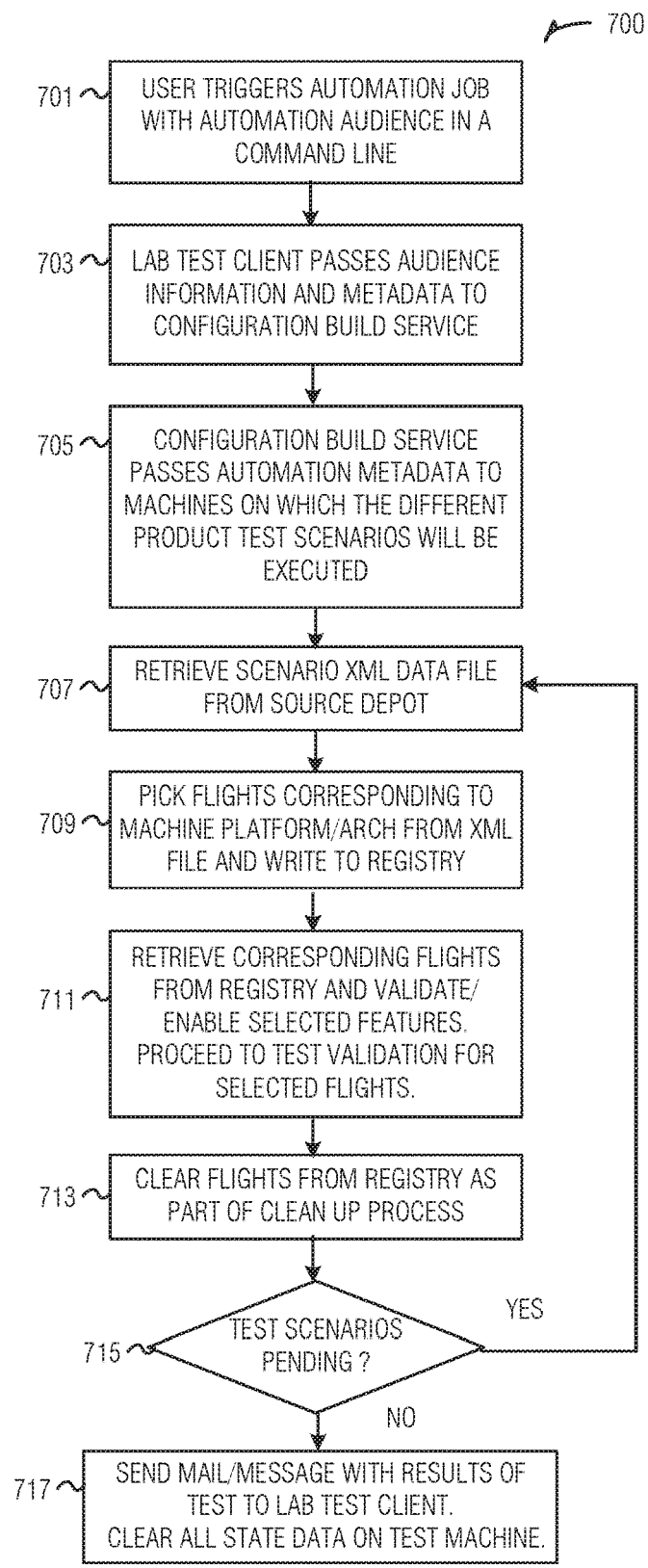
FIG. 7 is a flow diagram illustrating a method for dynamically triggering an automation job by impersonating an audience, according to an embodiment.

FIG. 7 is a flow diagram illustrating a method 700 for dynamically triggering a test automation job using the automation audience, according to an embodiment. A user or test engineer, may trigger an automation test job by selecting the automation audience in the invocation command, as discussed above in a command line, in block 701. Parameters to define the run may include development or production information and any necessary overrides. When the automation audience is specified, configurations marked for the specified audience group and all audience rings outside of the group may be retrieved. Parameters may include application flights or team flights. An application flight, for instance, may filter the features applied to only include all of those features that have been configured for a specific application in the experimentation and configuration system, in any audience. In an example, if the parameter is not set, flights for all applications may be retrieved. In an example, a team flight parameter may be used to filter flights based on the flight name, based on the development team. Various default cases, for instance, when a parameter is blank or missing, or undefined, may be pre-defined and stored in the experimentation and configuration system.

Once selected by command line, the lab test client may pass the audience information and metadata, such as build version number, architecture, platform, etc. to the configuration build service, such as the automation service, in block 703. The configuration build service is the service responsible for kicking off an automation job by setting up different physical and virtual machines configured based on the test suite that needs to be executed, as discussed above. The configuration build service may pass the test automation metadata to one or more physical or virtual machines on which the product test scenarios are to be executed, in block 705. A scenario XML file may be retrieved from the source depot, in block 707. The scenarios define what is to be tested for the audience, and optional flights. The flights corresponding to the audience, build and configuration defined in the XML file are selected and written to a database accessible by the test machine, such as in the system registry, in block 709.

Corresponding flights from the database/registry may be retrieved and selected features may be validated and enabled for the test run, in block 711. Test validation for the automation audience may then be performed for the selected flights. Once the testing is completed, the flights may be cleared from the registry as part of the clean-up process, in block 713. A determination is made in block 715 as to whether additional test scenarios are pending. In an example, the XML file is reviewed to ensure all test scenarios identified have been performed. In an example, each test scenario is saved in a different file, and list of such files to execute may be performed to ensure all test scenarios have been performed. If there are additional test scenarios, then processing continues in block 707 to retrieve the next test scenario file.

When test scenarios are complete, electronic mail or other message may be sent to the lab test client with the results of the test, in block 717. In an embodiment, all of the specifics of the test run outcomes are stored in a database managed by the automation service. The user who started the test may receive an email summary of what passed and what failed during the run. The email with test results may be sent to the user who triggered the job. The automation job results may also be retrieved by directly accessing the automation service portal. The results may be accessible for several days, or other period, based on storage space. In an example, the email information may categorize failures into three groups: new failures; untracked failures; and existing bugs. The email may also provide pointers into the bug history (e.g., in case of existing bug), and steps for investigating. The email may also include a link to a folder that has all of the logs generated during the automation run. Once the automation run results have been stored and user(s) notified, all state data on the test machines may be cleared in preparation for the next test.

Figure 8:
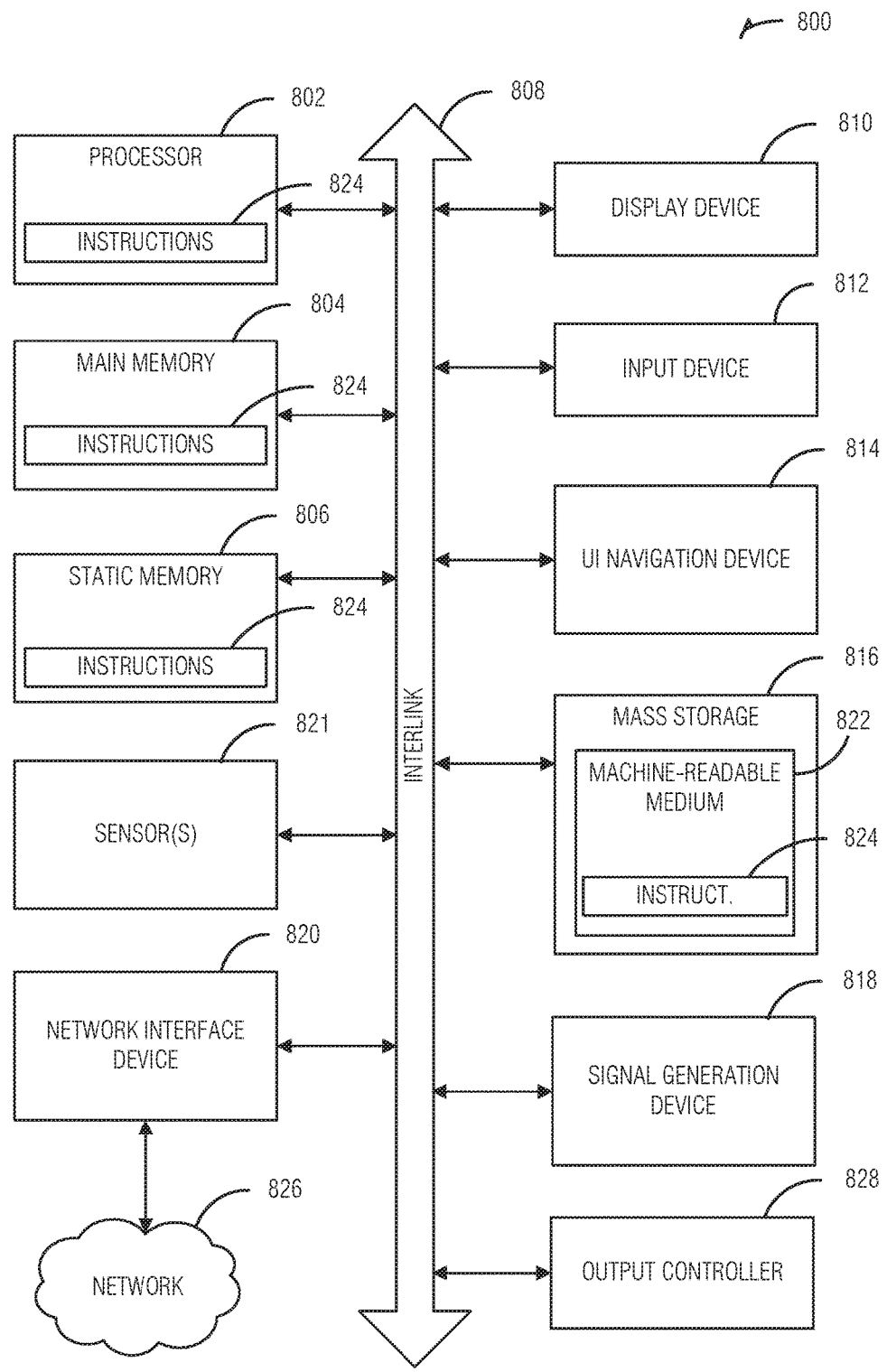
FIG. 8 is a diagram illustrating an example of a machine upon which one or more embodiments may be implemented.

FIG. 8 illustrates a diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Additional Notes and Examples

Examples may include subject matter such as a method, means for performing acts of the method, at least one machine-readable medium including instructions that, when performed by a machine cause the machine to performs acts of the method, or of an apparatus or system for test automation of a software build, according to embodiments and examples described herein.

Example 1 is a computer implemented method for test automation, comprising: receiving a build identifier and an automation audience identifier for a software application build in a user request for test automation; retrieving test run information for the software application build, the test run information associated with the selected build identifier and automation audience; identifying static features to apply to the software application build, the static features being identified in a configuration database as being associated with the automation audience identifier; responsive to the user request, identifying at least one optional feature to apply to the software application build, wherein application code for the at least one optional feature in the software application build includes a feature gate utilizing an application program interface to manage the at least one optional feature during runtime, based on the parameters associated with the at least one optional feature and the automation audience; generating a data file that identifies test parameters associated with a target platform and architecture associated with the software application build, the automation audience, and the at least one optional feature; storing the data file in a data store accessible by a configuration build service; initiating configuration of a test machine with the test parameters in the data file, by the configuration build service; and initiating a test automation run with the test parameters in the data file on the configured test machine.

In Example 2, the subject matter of Example 1 optionally includes wherein the build identifier and automation audience selection are designated in a command line, a format of the command line allowing a channel parameter, wherein the automation audience designation overrides channel information in the command line.

In Example 3, the subject matter of any one or more of Examples 1-2 optionally include executing an additional test run on the configured test machine when the data file indicates an additional test scenario.

In Example 4, the subject matter of Example 3 optionally includes wherein parameters associated with the software application build identify for each of the at least one optional feature at least one authorized audience and whether the each optional feature is enabled or disabled for the at least one authorized audience, and wherein the automation audience enables each optional feature identified as being enabled for at least one audience to be enabled for the automation audience.

In Example 5, the subject matter of Example 4 optionally includes wherein a first optional feature of the at least one optional feature enabled in the automation audience includes at least one treatment, and wherein each combination of the first optional feature with each at least one treatment results in an additional test scenario.

In Example 6, the subject matter of any one or more of Examples 1-5 optionally include clearing data including previous configuration data from the test machine before the configuring the test machine with the parameters in the data file.

In Example 7, the subject matter of any one or more of Examples 1-6 optionally include storing results from the automated test run in a data store accessible for analysis after the automated test run is completed.

In Example 8, the subject matter of any one or more of Examples 1-7 optionally include wherein the parameters associated with the at least one optional feature and the automation audience identify whether the at least one optional feature is one of enabled and disabled, and whether one or more treatments are associated with the at least one optional feature.

Example 9 is a computer readable storage medium having instructions stored thereon, the instructions when executed on a machine cause the machine to: receive a build identifier and an automation audience identifier for a software application build in a user request for test automation: retrieve test run information for the software application build, the test run information associated with the selected build identifier and automation audience; identify static features to apply to the software application build, the static features being identified in a configuration database as being associated with the automation audience identifier; responsive to the user request, identify at least one optional feature to apply to the software application build, wherein application code for the at least one optional feature in the software application build includes a feature gate utilizing an application program interface to manage the at least one optional feature during runtime, based on the parameters associated with the at least one optional feature and the automation audience; generate a data file that identifies test parameters associated with a target platform and architecture associated with the software application build, the automation audience, and the at least one optional feature; store the data file in a data store accessible by a configuration build service; initiate configuration of a test machine with the test parameters in the data file, by the configuration build service; and initiate a test automation run with the test parameters in the data file on the configured test machine.

In Example 10, the subject matter of Example 9 optionally includes wherein the build identifier and automation audience selection are designated in a command line, a format of the command line allowing a channel parameter, wherein the automation audience designation overrides channel information in the command line.

In Example 11, the subject matter of any one or more of Examples 9-10 optionally include instructions to execute an additional test run on the configured test machine when the data file indicates an additional test scenario.

In Example 12, the subject matter of Example 11 optionally includes wherein parameters associated with the software application build identify for each of the at least one optional feature at least one authorized audience, and whether the each of the at least one optional feature is enabled or disabled for the at least one authorized audience, and wherein the automation audience enables each of the at least one optional feature identified as being enabled for at least one audience to be enabled for the automation audience.

In Example 13, the subject matter of Example 12 optionally includes wherein a first optional feature of the at least one optional feature enabled in the automation audience includes at least one treatment, and wherein each combination of the first optional feature with each at least one treatment results in an additional test scenario.

In Example 14, the subject matter of any one or more of Examples 9-13 optionally include instructions to clear data including previous configuration data from the test machine before the configuring of the test machine with the parameters in the data file.

In Example 15, the subject matter of any one or more of Examples 9-14 optionally include instructions to store results from the automated test run in a data store accessible for analysis after the automated test run is completed.

In Example 16, the subject matter of any one or more of Examples 9-15 optionally include wherein the parameters associated with the at least one optional feature and the automation audience identify whether the at least one optional feature is one of enabled and disabled, and whether one or more treatments are associated with the at least one optional feature.

Example 17 is a system for automation testing of a software build according to an automation audience, comprising: a processor to execute automation build logic, the automation build logic configured to generate the software build for an automation test using build configuration information to identify static and optional features for inclusion in the software build, for the automation audience; a configuration database storing feature configuration information, wherein feature configuration information associated with a feature includes filter information for audience, platform, architecture and features; and the automation build logic further configured to, in response to instructions to build an automation test build with the automation audience, generate a data file identifying configuration settings for a test machine, wherein the configuration settings include feature information for the software build, where a feature is identified as enabled if the feature is enabled by the automation audience build defined in the configuration database unless overridden in the instructions, and wherein the automation build logic is further configured to initiate a data wipe of the test machine and then to initiate configuration of the test machine according to the data file identifying configuration settings for the test machine.

In Example 18, the subject matter of Example 17 optionally includes wherein application code for each of the optional features in the software application build includes a feature gate utilizing an application program interface to dynamically manage the each optional feature during runtime, based on the feature configuration information associated with the each optional feature and the automation audience.

In Example 19, the subject matter of any one or more of Examples 17-18 optionally include wherein a feature is identified as enabled by default if the feature is enabled by any audience build defined in the configuration database unless overridden in the instructions.

In Example 20, the subject matter of any one or more of Examples 17-19 optionally include wherein the optional features for inclusion in the software build are enabled or disabled according to the feature configuration information, and information corresponding to the feature configuration information is configured to be stored in a test machine database accessible during the automation test, and wherein optional features not associated with the automation audience are disabled in the software build, wherein the test machine database storing the information corresponding to the feature configuration information comprises a system registry or an emulated system registry coupled to the test machine.

Example 21 is a system configured to perform operations of any one or more of Examples 1-20.

Example 22 is a method for performing operations of any one or more of Examples 1-20.

Example 23 is a machine readable medium including instructions that, when executed by a machine cause the machine to perform the operations of any one or more of Examples 1-20.

Example 24 is a system comprising means for performing the operations of any one or more of Examples 1-20.

The techniques described herein are not limited to any particular hardware or software configuration; the) may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural, declarative, and/or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third,"

etc. are used merely as labels, and are not intended to suggest a numerical order for their objects.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A computer implemented method for test automation, comprising:
   receiving a build identifier and a selection of an automation audience for a software application build in a user request for test automation;
   retrieving test run information for the software application build, the test run information associated with the build identifier and the automation audience, wherein the build identifier and the automation audience are designated in a command line, a format of the command line allowing a channel parameter, wherein the selection of the automation audience overrides channel information in the command line;
   identifying static features to apply to the software application build, the static features being identified in a configuration database as being associated with the automation audience;
   responsive to the user request, identifying an optional feature to apply to the software application build, wherein application code for the optional feature in the software application build includes a feature gate utilizing an application program interface to manage the optional feature during runtime, the managing being based on the parameters associated with the optional feature and the automation audience, wherein the feature gate is associated with two optional variables to enable or disable a feature, wherein the parameters identify at least one authorized audience for the optional feature and identify whether the optional feature is enabled or disabled for the at least one authorized audience, and wherein the automation audience enables the optional feature identified as being enabled for the at least one authorized audience;
   generating a data file that identifies test parameters associated with a target platform and target architecture associated with the software application build, the automation audience, and the optional feature;
   storing the data file in a data store accessible by a configuration build service;
   initiating configuration of a test machine with the test parameters in the data file, by the configuration build service; and
   initiating a test automation run with the test parameters in the data file on the configured test machine.

2. The computer implemented method as recited in claim 1, further comprising: executing an additional test run on the configured test machine when the data file indicates an additional test scenario.

3. The computer implemented method as recited in claim 1, wherein the optional feature is enabled in the automation audience and includes at least one treatment, and wherein each combination of the optional feature with each at least one treatment results in an additional test scenario.

4. The computer implemented method as recited in claim 1, further comprising: clearing data including previous configuration data from the test machine before the configuring the test machine with the parameters in the data file.

5. The computer implemented method as recited in claim 1, further comprising: storing results from the automated test run in a data store accessible for analysis after the automated test run is completed.

6. The computer implemented method as recited in claim 1, wherein the parameters associated with the optional feature and the automation audience identify whether the optional feature is one of enabled and disabled, and identify whether one or more treatments are associated with the at least one optional feature.

7. A non-transitory computer readable storage medium having instructions stored thereon, the instructions when executed on a machine cause the machine to:
   receive a build identifier and a selection of an automation audience for a software application build in a user request for test automation;
   retrieve test run information for the software application build, the test run information associated with the build identifier and the automation audience, wherein the build identifier and the automation audience are designated in a command line, a format of the command line allowing a channel parameter, wherein the selection of the automation audience overrides channel information in the command line;
   identify static features to apply to the software application build, the static features being identified in a configuration database as being associated with the automation audience;
   responsive to the user request, identify an optional feature to apply to the software application build, wherein application code for the optional feature in the software application build includes a feature gate utilizing an application program interface to manage the optional feature during runtime, the managing being based on the parameters associated with the optional feature and the automation audience, wherein the feature gate is associated with two optional variables to enable or disable a feature, wherein the parameters identify at least one authorized audience for the optional feature, and identify whether the optional feature is enabled or disabled for the at least one authorized audience, and wherein the automation audience enables optional feature identified as being enabled for the at least one authorized audience;
   generate a data file that identifies test parameters associated with a target platform and target architecture associated with the software application build, the automation audience, and the optional feature;
   store the data file in a data store accessible by a configuration build service;
   initiate configuration of a test machine with the test parameters in the data file, by the configuration build service; and
   initiate a test automation run with the test parameters m the data file on the configured test machine.

8. The computer readable storage medium as recited in claim 7, further comprising instructions to execute an additional test run on the configured test machine when the data file indicates an additional test scenario.

9. The computer readable storage medium as recited in claim 8, wherein the optional feature is enabled in the automation audience and includes at least one treatment, and wherein each combination of the optional feature with each at least one treatment results in an additional test scenario.

10. The computer readable storage medium as recited in claim 7, further comprising instructions to clear data including previous configuration data from the test machine before the configuring of the test machine with the parameters in the data file.

11. The computer readable storage medium as recited in claim 7, further comprising instructions to store results from the automated test run in a data store accessible for analysis after the automated test run is completed.

12. The computer readable storage medium as recited in claim 7, wherein the parameters associated with the optional feature and the automation audience identify whether the optional feature is one of enabled and disabled, and identify whether one or more treatments are associated with the at least one optional feature.

13. A system for automation testing of a software build according to an automation audience, comprising:
    a memory storing one or more sets of instructions; and
    a processor to execute the one or more set of instructions to receive a build identifier and a selection of an automation audience for a software application build in a user request for test automation; retrieve test run information for the software application build, the test run information associated with the build identifier and the automation audience, wherein the build identifier and the automation audience are designated in a command line, a format of the command line allowing a channel parameter, wherein the selection of the automation audience designation overrides channel information in the command line;
    the processor to execute automation build logic, the automation build logic configured to generate the software build for an automation test using build configuration information to identify static and optional features for inclusion in the software build, for the automation audience, wherein application code for each of the optional features in the software application build includes a feature gate utilizing an application program interface to dynamically manage the each optional feature during runtime, based on the feature configuration information associated with the each optional feature and the automation audience, wherein the feature gate is associated with two optional variables to enable or disable a feature, wherein the parameters identify at least one authorized audience for the optional feature and identify whether the optional feature is enabled or disabled for the at least one authorized audience, and wherein the automation audience enables the optional feature identified as being enabled for the at least one authorized audience;
    a configuration database storing feature configuration information, wherein feature configuration information associated with a feature includes filter information for audience, platform, architecture, and features; and
    the automation build logic further configured to, in response to instructions to build an automation test build with the automation audience, generate a data file identifying configuration settings for a test machine, wherein the configuration settings include feature information for the software build, where a feature is identified as enabled if the feature is enabled by the automation audience build, the automation audience build being defined in the configuration database, the feature enabled unless overridden in the instructions, and wherein the automation build logic is further configured to initiate a data wipe of the test machine and then to initiate configuration of the test machine according to the datafile identifying configuration settings for the test machine.

14. The system as recited in claim 13, wherein a feature is identified as enabled by default if the feature is enabled by any audience build defined in the configuration database unless overridden in the instructions.

15. The system as recited in claim 13, wherein the optional features for inclusion in the software build are enabled or disabled according to the feature configuration information, and information corresponding to the feature configuration information is configured to be stored in a test machine database accessible during the automation test, and wherein optional features not associated with the automation audience are disabled in the software build, wherein the test machine database storing the information corresponding to the feature configuration information comprises a system registry or an emulated system registry coupled to the test machine.

* * * * *